United States Patent
Zhang et al.

(10) Patent No.: US 12,221,366 B1
(45) Date of Patent: Feb. 11, 2025

(54) METHOD FOR RECYCLING COPPER-CONTAINING WASTEWATER FROM MICRO-ETCHING

(71) Applicant: Central South University, Changsha (CN)

(72) Inventors: Chenyang Zhang, Changsha (CN); Mingjun Han, Changsha (CN); Wei Sun, Changsha (CN); Jie Li, Changsha (CN); Wenjihao Hu, Changsha (CN); Heng Yu, Changsha (CN); Rong Wang, Changsha (CN); Siyuan Liu, Changsha (CN); Xiangsong Meng, Changsha (CN); Pan Chen, Changsha (CN)

(73) Assignee: CENTRAL SOUTH UNIVERSITY, Changsha (CN)

( * ) Notice: Subject to any disclaimer, the term of this patent is extended or adjusted under 35 U.S.C. 154(b) by 0 days.

(21) Appl. No.: 18/804,147

(22) Filed: Aug. 14, 2024

(51) Int. Cl.
| | |
|---|---|
| *C02F 1/52* | (2023.01) |
| *C01G 49/12* | (2006.01) |
| *C02F 1/66* | (2023.01) |
| *C02F 101/20* | (2006.01) |
| *C02F 103/34* | (2006.01) |

(52) U.S. Cl.
CPC ............ *C02F 1/5236* (2013.01); *C01G 49/12* (2013.01); *C02F 1/66* (2013.01); *C01P 2004/03* (2013.01); *C02F 2101/20* (2013.01); *C02F 2103/346* (2013.01)

(58) Field of Classification Search
None
See application file for complete search history.

(56) References Cited

U.S. PATENT DOCUMENTS

2007/0114185 A1   5/2007   Alexander et al.

FOREIGN PATENT DOCUMENTS

| BE | 761474 A | 6/1971 |
|---|---|---|
| CA | 2908548 A1 | 4/2016 |
| CN | 103803744 A | 5/2014 |
| CN | 104261526 A | 1/2015 |

(Continued)

OTHER PUBLICATIONS

Sun Ye, et al., Functionalized Iron-Based Nano Materials for Removal of Mercury from Aqueous Solution, Progress in Chemistry, 2016, pp. 1156-1169, vol. 28 No. 8.

*Primary Examiner* — Peter Keyworth
(74) *Attorney, Agent, or Firm* — Bayramoglu Law Offices LLC

(57) ABSTRACT

A method for recycling a copper-containing wastewater from a micro-etching is provided, including: modifying a FeS material with a monomer including both carboxyl and sulfhydryl, a crosslinking agent, and a stabilizing and dispersing agent to obtain a FeS-based pH-responsive material CMC-FeS@HS #SiO$_2$ #COOH, adding the FeS-based pH-responsive material to weakly-acidic copper-containing wastewater from the micro-etching to allow a reaction, and conducting processes such as sulfide precipitation, exchange, adsorption complexation, and flocculation precipitation to finally obtain a precipitate with CuS as a main component. This method makes full use of the pH responsiveness and abundant surface active sites of the FeS-based pH-responsive material, and can control a recovery rate of copper ions in the wastewater at 99.8% or more merely by adjusting a pH value of the copper-containing wastewater from the micro-etching.

7 Claims, 3 Drawing Sheets

(56) References Cited

FOREIGN PATENT DOCUMENTS

| | | |
|---|---|---|
| CN | 104478004 A | 4/2015 |
| CN | 113121941 A | 7/2021 |
| CN | 114959784 A | 8/2022 |
| EP | 0529453 A2 | 3/1993 |
| FR | 1032649 A | 7/1953 |

METHOD FOR RECYCLING COPPER-CONTAINING WASTEWATER FROM MICRO-ETCHING

CROSS REFERENCE TO THE RELATED APPLICATIONS

This application is based upon and claims priority to Chinese Patent Application No. 202311184483.0, filed on Sep. 14, 2023, the entire contents of which are incorporated herein by reference.

TECHNICAL FIELD

The present disclosure relates to a method for recycling a copper-containing wastewater from micro-etching, and belongs to the technical field of industrial heavy metal-containing wastewater treatment.

BACKGROUND

While modern industry has created a huge material wealth for human beings, related industrial production processes (such as electroplating, mineral processing, metallurgy, petrochemicals, and tanning) have also led to a large amount of heavy metal pollutant-containing wastewater. The prevention and control of heavy metal pollution in water resources has become a resource and environmental problem, arousing wide concern worldwide.

If discharged without reaching a specified standard, wastewater will cause heavy pollution in rivers, lakes, and seas to harm aquatic organisms and will permeate into the soil to harm crops, thereby posing a huge threat to the entire ecosystem. The coexistence of various heavy metal ions and the complexation of metal ions with refractory organic ligands in wastewater make it difficult to treat and recycle the wastewater and result in a high cost of wastewater treatment.

In copper-containing wastewater from micro-etching, in addition to Cu(II), the electroplating solution also includes organic and inorganic substances such as a surfactant, a brightener, and a retarder. During the cleaning process of a plated object, Cu(II), organic and inorganic substances, or the like in a liquid adhered to the plated object are taken away by clean water to produce copper-containing wastewater, which mainly has strong stability, high toxicity, and considerable resource attributes. If heavy metal ions are compared to soldiers on a battlefield, organic substances serve as shields to protect the soldiers from harm. Cu(II) exhibits a high affinity for monodentate or multidentate carboxyl, amino, and phenolic hydroxyl ligands that include oxygen (O), nitrogen (N), and sulfur (S) in organic substances in wastewater and finally exists in the form of a complicated and stable metal-organic complex. Cu(II) cannot be biodegraded and easily accumulates in organisms, thereby causing accumulative, latent, and irreversible hazards to the organisms, continuously causing a negative effect on the entire ecosystem through a food chain, and eventually inducing various diseases and even genetic mutations. Compared with natural minerals that mostly have a low grade, a small grain size, a complicated composition, and scattered occurrence in nature, concentrations of Cu(II) in copper-containing wastewater from micro-etching and comprehensive organic wastewater reach about 7 g/L and 60 mg/L, respectively, which can be regarded as enriched ores in the field of mineral engineering and have significant mining and smelting values. Given the price of about 65,000 yuan per ton of copper, the recycling of Cu(II) in copper-containing wastewater from micro-etching cannot only effectively solve the environmental pollution problem of heavy metal copper ions but also allow the comprehensive recycling of valuable copper, thereby compensating or even offsetting a water treatment cost.

Various conventional processes have been widely used to remove heavy metals from wastewater, mainly including a chemical precipitation process, an oxidation reduction process, an adsorption process, a membrane separation process, and an ion exchange process. The microbiological process, the ion exchange process, and the extraction method have been successively confirmed to exhibit a specified treatment effect for heavy metal complex-containing wastewater, but due to factors such as the increase in migration rate and toxicity of heavy metal complex-containing wastewater and the change of a water matrix, a treatment effect for a combination of heavy metals and organic substances is always inferior to a purification and recovery effect for the heavy metals or the organic substances alone.

According to the hard-soft-acid-base theory, heavy metal ions generally belong to soft acids or borderline acids, and organic sulfur and inorganic sulfur belong to soft bases or borderline bases. Thus, heavy metal ions easily bind to organic sulfur and inorganic sulfur to produce stable, insoluble chelation precipitates.

Common inorganic sulfide precipitants mainly include sodium sulfide ($Na_2S$), calcium polysulfide ($CaS_x$), ferrous sulfide (FeS), and hydrogen sulfide ($H_2S$). Under acidic conditions, an inorganic sulfide precipitant reacts with a heavy metal ion such as copper to produce a sulfide precipitate with a small solubility product. However, under acidic conditions, it is easy to generate a toxic gas of hydrogen sulfide, precipitated particles are fine and difficult to filter and have poor sedimentation performance, and excess sulfur ions in a solution increase the chemical oxygen demand of wastewater.

Organosulfur-type heavy metal chelating agents mainly include TMT, DTC, STC, and xanthic acid. The chelation precipitation is conducive to the deep purification of Cu(II) in wastewater but is still faced with problems such as difficult selective removal and inapplicable resource recycling.

The mainstream treatment process is pretreatment-membrane separation-concentrate treatment, which also has problems such as difficult centralized treatment of multi-procedure combined wastewater, low water recycling and reuse rate, large sludge harm, high outsourcing cost, and heavy valuable resource waste and can no longer meet the increasing requirements of discharged water quality standards and resource recycling.

SUMMARY

In order to solve the problems such as difficult deep purification, low recycling rate, and high recycling cost of Cu(II) in wastewater in the prior art, an objective of the present disclosure is to provide a method for recycling a copper-containing wastewater from micro-etching. This method makes full use of the fact that a FeS-based pH-responsive material (CMC-FeS@HS #$SiO_2$ #COOH) can slowly release $HS^-$ and abundant surface active sites under weakly-acidic conditions, and can allow the efficient precipitation of Cu(II) merely by adjusting a pH value of a copper-containing wastewater from micro-etching, thereby allowing the recycling of Cu(II).

In order to allow the above technical objective, the present disclosure provides a method for recycling a copper-containing wastewater from micro-etching, including: adding a FeS-based pH-responsive material to weakly-acidic copper-containing wastewater from micro-etching, to allow a reaction I to obtain a precipitate with CuS as a main component. The FeS-based pH-responsive material is prepared through the following process: slowly adding a sulfide salt solution to a mixed solution including a modified crosslinking agent, a stabilizing and dispersing agent, and a ferrous salt, to allow a heterogeneous precipitation reaction, where the modified crosslinking agent is obtained through a crosslinking reaction of a monomer including both carboxyl and sulfhydryl with a crosslinking agent.

In the technical solution of the present disclosure, a principle that the FeS-based pH-responsive material can quickly and efficiently allow the precipitation and recovery of Cu(II) in a copper-containing wastewater from micro-etching is as follows: FeS will slowly release highly-active $HS^-$ under the promotion of $H^+$ in a weakly-acidic solution system, and the highly-active $HS^-$ will undergo a precipitation reaction with Cu(II) to produce CuS, which improves a precipitation rate of Cu(II). In addition, a release rate of highly-active $HS^-$ can be controlled by controlling a weakly-acidic environment to avoid the escape of $H_2S(g)$ generated by $HS^-$ and hydrogen ions, improve a utilization rate of the FeS-based pH-responsive material, and reduce the environmental pollution. Cu(II) can also partially replace FeS to produce a CuS precipitate and Fe(II), and Fe(II) is unstable in a solution and is easily hydrolyzed to produce $Fe(OH)_3$, which promotes the flocculation precipitation of CuS. In addition, there are abundant active sites on a surface of the FeS-based pH-responsive material of the present disclosure, such that copper ions can be converted into a CuS precipitate by highly-active $HS^-$ released from FeS, which can greatly improve a precipitation efficiency of copper ions in a solution system and is conducive to the deep removal of copper ions in the solution system. A precipitation mechanism of the present disclosure is specifically shown in the following reaction equations:

$$FeS(s)+H^+ \leftrightarrows Fe(II)+HS^- \quad (1)$$

$$HS^-+H^+ \leftrightarrows H_2S(aq) \quad (2)$$

$$Cu(II)+H_2S^- \leftrightarrows CuS(s)+H^+ \quad (3)$$

$$Cu(II)+H_2S(aq) \leftrightarrows CuS(s)+2H^+ \quad (4)$$

$$FeS(s)+Cu(II) \leftrightarrows CuS(s)+Fe(II) \quad (5)$$

$$FeS(s)+Cu(II) \leftrightarrows [Fe_{1-x},Cu_x]S(s)+xFe(II)(x<1) \quad (6)$$

$$\equiv[FeS(s)]+Cu(II) \leftrightarrows \equiv[FeS(s)\text{-}Cu(II)](s) \quad (7)$$

$$Fe(OH)_3(s)+CuS(s) \leftrightarrows [Fe(OH)_3\text{—}CuS](s) \quad (8)$$

As a preferred solution, the reaction I is conducted at a pH value of 3.95 to 6.05 for 10 min to 25 min. The pH value of the present disclosure has a direct impact on an effect of the FeS-based pH-responsive material to treat copper ions, and a too-high or too-low pH value will reduce a precipitation effect of copper ions.

As a preferred solution, the present disclosure adopts sulfuric acid and sodium hydroxide to adjust the pH value of the system.

As a preferred solution, a $Cu^{2+}/S^{2-}$ molar ratio of the copper-containing wastewater from the micro-etching to the FeS-based pH-responsive material is 1:(1.0-1.25). If the molar ratio of copper ions to sulfur ions is too low, a recovery rate of copper ions will be reduced, and it is impossible to allow a prominent precipitation effect. However, if the molar ratio is further increased, the recovery rate will not change significantly, and a cost of the FeS-based pH-responsive material will be increased.

In the technical solution of the present disclosure, a mechanism of modifying the FeS-based pH-responsive material (CMC-FeS@HS #SiO$_2$ #COOH) is as follows:

1) Generation of surface active sites of a crosslinking agent: An oxygen atom in a silicon-oxygen bond (Si—O—Si) on a surface of silica undergoes a hydrolysis reaction with a water molecule to produce hydroxylated silica, namely silicon-hydroxyl (Si—OH) and a hydroxide ion (OH$^-$). The silicon-hydroxyl and the hydroxide ion provide reactive sites for the subsequent sulfhydrylation modification and carboxylation reaction.

2) Sulfhydrylation modification and carboxylation modification of a crosslinking agent: Hydroxylated silica is modified with a monomer including both sulfhydryl and carboxyl. The sulfhydryl (_SH) of the monomer can be substituted with the hydroxyl (_OH) on a surface of the silica to produce sulfhydryl-modified silica. In addition, the carboxyl (_COOH) of the monomer undergoes an esterification reaction with the silicon-hydroxyl (Si_OH) on the surface of the silica, and specifically, carbonyl carbon (C═O) of the carboxyl is combined with a hydrogen atom (H) in the silicon-hydroxyl to produce an ester bond (C_O_Si) linkage. The monomer including both sulfhydryl and carboxyl is crosslinked with the silica to produce sulfhydrylated and carboxylated silica (HS #SiO$_2$ #COOH).

3) In-situ crosslinking reaction: Sulfhydryl (_SH) in the sulfhydrylated and carboxylated silica (HS #SiO$_2$ #COOH) reacts with Fe$^{2+}$ in a ferrous salt solution to produce Fe—S bonding. Then, when a sodium sulfide solution is added dropwise to a reaction system, Fe$^{2+}$ undergoes a chemical reaction with S$^{2-}$ from the sodium sulfide solution to finally produce a FeS-based pH-responsive material CMC-FeS@HS #SiO$_2$ #COOH.

In the present disclosure, nanoscale active ferrous sulfide (FeS) particles can be produced through a heterogeneous precipitation reaction of a ferrous salt and a sulfide salt under oxygen-free conditions, and the modified silica can be uniformly grafted on a surface of the ferrous sulfide particles, thereby greatly increasing the surface active adsorption sites for copper ions on the surface of ferrous sulfide particles. In addition, the stabilizing and dispersing agent added during the reaction can disperse the sulfhydrylated FeS-based material to prevent the agglomeration and increase a specific surface area for the reaction.

As a preferred solution, the crosslinking reaction is conducted in a mixed solution of deionized water and absolute ethanol, and a pH of the system is controlled at 5 to 7.

As a preferred solution, a volume ratio of the deionized water to the absolute ethanol is (5-10):(12-20).

As a preferred solution, the monomer including both the carboxyl and the sulfhydryl includes at least one of mercaptopropionic acid, mercaptoacetic acid, and mercaptoacrylic acid.

As a preferred solution, the crosslinking agent is nanoscale silica. The present disclosure can effectively immobilize the monomer including both the carboxyl and the sulfhydryl through the selected crosslinking agent, thereby allowing the modification of FeS and improving the stability and durability of FeS.

As a preferred solution, a molar ratio of the monomer including both the carboxyl and the sulfhydryl to the crosslinking agent is (1.0-1.6):1.

As a preferred solution, the stabilizing and dispersing agent includes carboxymethyl cellulose (CMC), a sulfide salt includes at least one of sodium sulfide and calcium polysulfide, and the ferrous salt includes at least one of ferrous sulfate, ferrous ammonium sulfate, ferrous chloride, a ferrous sulfate hydrate, a ferrous ammonium sulfate hydrate, and a ferrous chloride hydrate.

As a preferred solution, a molar ratio of the crosslinking agent to the ferrous salt is 1:(1-3).

As a preferred solution, a molar ratio of the stabilizing and dispersing agent to the ferrous salt is $(5.0 \times 10^{-4} - 2.0 \times 10^{-3})$:1.

As a preferred solution, a $Fe^{2+}/S^{2-}$ molar ratio of the ferrous salt to the sulfide salt is (1-1.2):1. The selected range ensures that $S^{2-}$ can fully react with $Fe^{2+}$, which can prevent the combination of excess $S^{2-}$ with $H^+$ in a solution during the subsequent heavy metal-containing wastewater treatment to produce the toxic gas $H_2S$ with a rotten egg odor.

As a preferred solution, the heterogeneous precipitation reaction is conducted under oxygen-free conditions, which is intended to prevent the oxidation of $Fe^{2+}$ into $Fe^{3+}$ during preparation. Specific measures of the present disclosure to control an oxygen-free environment are as follows: 1) Air in experimental deionized water is removed with $N_2$ before an experiment. 2) Before sodium sulfide is added dropwise to a three-necked flask to allow a reaction, air in a reaction device is pumped out three times by a diaphragm vacuum pump, and a $N_2$ balloon is controlled through a switch of a three-way glass piston to introduce $N_2$ into a reaction system.

As a preferred solution, the heterogeneous precipitation reaction is conducted at 25° C. to 35° C. for 60 min to 120 min. The conditions adopted by the present disclosure can guarantee that the ferrous salt fully reacts with the sodium sulfide.

Compared with the prior art, the present disclosure has the following beneficial effects:

1) The FeS-based pH-responsive material adopted in the present disclosure can treat copper-containing wastewater from micro-etching at a pH of 3.95 to 6.05, and can enhance the recycling of copper ions in wastewater with a copper ion recovery rate of 99.8% or more.

2) The FeS-based pH-responsive material of the present disclosure has abundant surface adsorption active sites, which increases an adsorption force for Cu(II) in copper-containing wastewater from micro-etching. As a result, the precipitation of Cu(II) by the FeS-based pH-responsive material of the present disclosure is allowed through a synergistic effect of processes such as sulfide precipitation, ion exchange, adsorption complexation, and flocculation precipitation, and has a high efficiency.

3) In the present disclosure, after Cu(II) in copper-containing wastewater from micro-etching is treated, a precipitate with CuS as a main component is obtained, and the precipitate can be used in the ore blending for smelting of a copper sulfide mineral.

DETAILED DESCRIPTION OF THE EMBODIMENTS

In order to facilitate the understanding of the present disclosure, the present disclosure is described in detail below in conjunction with preferred examples, but the protection scope of the present disclosure is not limited to the following specific examples.

Unless otherwise defined, all technical terms used hereinafter have the same meaning as commonly understood by those skilled in the art. The technical terms used herein are merely for the purpose of describing specific examples, and are not intended to limit the protection scope of the present disclosure.

Unless otherwise specified, various reagents and raw materials used in the present disclosure all are commodities that can be purchased from the market or products that can be prepared by a well-known method.

The FeS-based pH-responsive material used in the examples and comparative examples was prepared through the following steps:

1) 8 parts by volume of deionized water and 15 parts by volume of absolute ethanol were taken and thoroughly mixed, and a pH was adjusted to 5.5 to obtain a mixed solution.

Mercaptopropionic acid and nanoscale silica (a molar ratio of the mercaptopropionic acid to the nanoscale silica was 1.2:1, and a molar ratio of the nanoscale silica to a ferrous salt was 1:2) were mixed in the above mixed solution and stirred to allow a full crosslinking reaction to produce sulfhydrylated and carboxylated silica.

Figure 1:
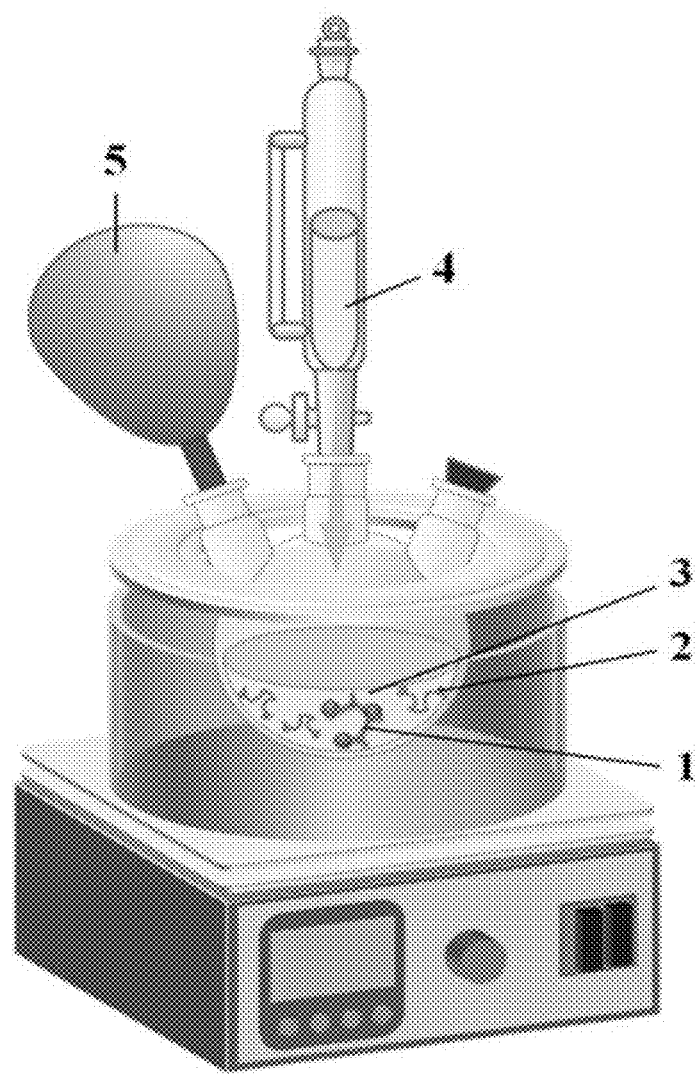
FIG. 1 is a schematic diagram of the preparation process of the FeS-based pH-responsive material in the present disclosure, where 1: modified crosslinking agent, 2: stabilizing and dispersing agent, 3: ferrous sulfate solution, 4: sodium sulfide solution, and 5: nitrogen.
Figure 2:
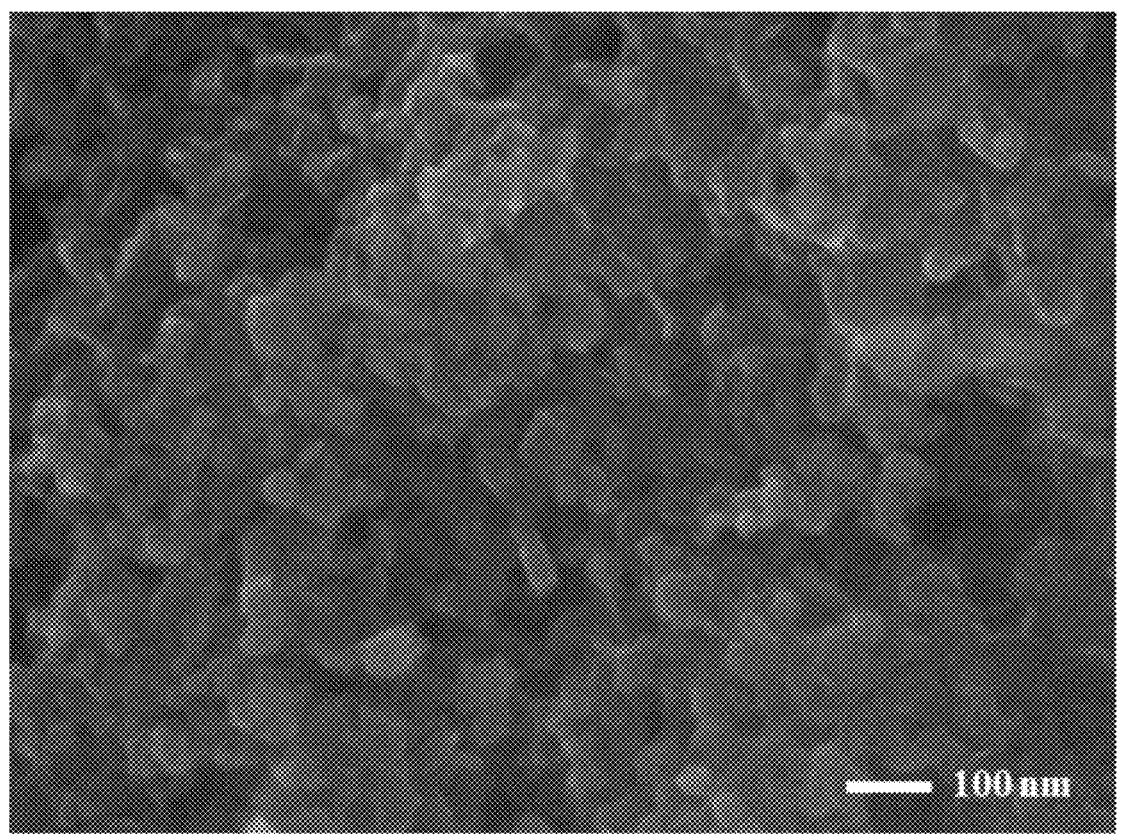
FIG. 2 is a scanning electron microscopy (SEM) image of the FeS-based pH-responsive material prepared in Example 1 of the present disclosure.
Figure 3:
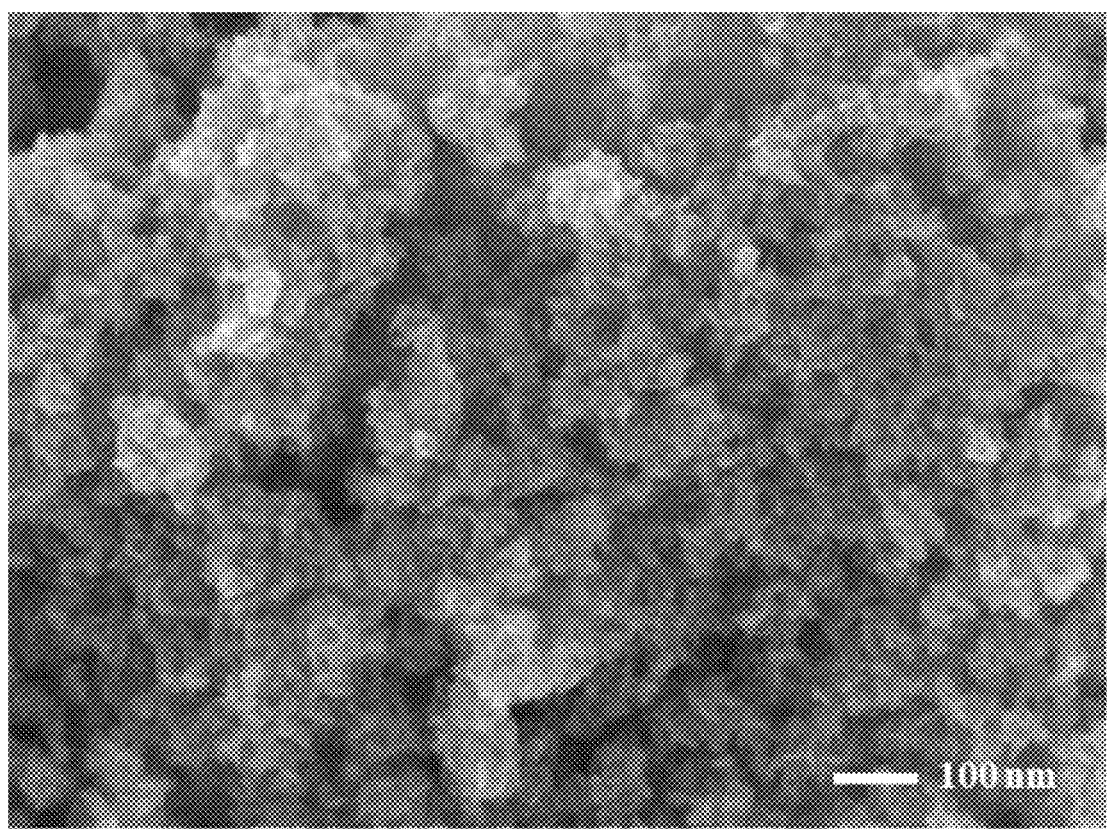
FIG. 3 is an SEM image of a precipitate produced after copper-containing wastewater from micro-etching is treated with the FeS-based pH-responsive material prepared in Example 1 of the present disclosure.

2) According to the schematic diagram of the preparation process of the material in FIG. 1: The sulfhydrylated and carboxylated silica as a crosslinking agent and CMC as a stabilizing and dispersing agent were added to a three-necked flask filled with a ferrous sulfate solution (0.6 mol/L, a molar ratio of the stabilizing and dispersing agent to ferrous sulfate was $2.0 \times 10^{-3}$:1), and stirring was conducted at 35° C. in an oxygen-free environment to allow thorough mixing.

Then, the three-necked flask was equipped with a constant-pressure drop funnel in which a sodium sulfide solution of an equal volume to the ferrous sulfate solution (a molar ratio of $Fe^{2+}$ to $S^{2-}$ was 1.1:1) was placed and a three-way glass piston on which an $N_2$ balloon was arranged.

After an experiment began, the sodium sulfide solution was added dropwise to the three-necked flask by unscrewing a switch of the constant-pressure drop funnel, and a full reaction was allowed for 60 min at 30° C. under magnetic stirring in an oxygen-free environment to produce the FeS-based pH-responsive material.

The wastewater treated in the following examples and comparative examples was high-concentration copper-containing wastewater produced in a production process of a printed circuit board of a specified electronics Co., Ltd. in Jiangsu, namely, copper-containing wastewater from micro-etching. A concentration of each metal element in the wastewater was determined by inductively coupled plasma-atomic emission spectroscopy (ICP-AES), and specific components were shown in Table 1. A content of the metal element after wastewater treatment was shown in Table 1.

TABLE 1

Composition of a stock solution of the copper-containing wastewater from micro-etching of the specified electronics Co., Ltd. in Jiangsu

| Element | Cu | Zn | Pb | Fe | Ni | Cr |
|---|---|---|---|---|---|---|
| Content (mg/L) | 6276.65 | 14.48 | 3.58 | 0.32 | 0.22 | 0.14 |

Example 1

An appropriate amount of the copper-containing wastewater from micro-etching was taken and added to a reaction vessel, a pH was adjusted to 4.20±0.05 using a sulfuric acid solution with a volume concentration of 10% and a sodium hydroxide solution with a mass concentration of 20%, the FeS-based pH-responsive material prepared above was added with a molar ratio of $S^{2-}$ in the material to $Cu^{2+}$ in the copper-containing wastewater from micro-etching controlled at 1.2:1, and a reaction was allowed for 20 min.

A precipitate produced after the copper-containing wastewater from micro-etching was treated by the FeS-based pH-responsive material in this example was subjected to energy dispersive spectroscopy (EDS). Results showed that there were C, O, Fe, Cu, and S elements in the precipitate, with weight proportions of 12.48%, 2.34%, 0.85%, 57.46%, and 26.87%, respectively.

Example 2

An appropriate amount of the copper-containing wastewater from micro-etching was taken and added to a reaction vessel, a pH was adjusted to 5.00±0.05 using a sulfuric acid solution with a volume concentration of 10% and a sodium hydroxide solution with a mass concentration of 20%, the FeS-based pH-responsive material prepared above was added with a molar ratio of $S^{2-}$ in the material to $Cu^{2+}$ in the copper-containing wastewater from micro-etching controlled at 1.2:1, and a reaction was allowed for 20 min.

Example 3

An appropriate amount of the copper-containing wastewater from micro-etching was taken and added to a reaction vessel, a pH was adjusted to 5.80±0.05 using a sulfuric acid solution with a volume concentration of 10% and a sodium hydroxide solution with a mass concentration of 20%, the FeS-based pH-responsive material prepared above was added with a molar ratio of $S^{2-}$ in the material to $Cu^{2+}$ in the copper-containing wastewater from micro-etching controlled at 1.2:1, and a reaction was allowed for 20 min.

Example 4

An appropriate amount of the copper-containing wastewater from micro-etching was taken and added to a reaction vessel, a pH was adjusted to 5.00±0.05 using a sulfuric acid solution with a volume concentration of 10% and a sodium hydroxide solution with a mass concentration of 20%, the FeS-based pH-responsive material prepared above was added with a molar ratio of $S^{2-}$ in the material to $Cu^{2+}$ in the copper-containing wastewater from micro-etching controlled at 1:1, and a reaction was allowed for 20 min.

Comparative Example 1

An appropriate amount of the copper-containing wastewater from micro-etching was taken and added to a reaction vessel, a pH was adjusted to 1.00±0.05 using a sulfuric acid solution with a volume concentration of 10% and a sodium hydroxide solution with a mass concentration of 20%, the FeS-based pH-responsive material prepared above was added with a molar ratio of $S^{2-}$ in the material to $Cu^{2+}$ in the copper-containing wastewater from micro-etching controlled at 1.2:1, and a reaction was allowed for 20 min.

Comparative Example 2

An appropriate amount of the copper-containing wastewater from micro-etching was taken and added to a reaction vessel, a pH was adjusted to 2.00±0.05 using a sulfuric acid solution with a volume concentration of 10% and a sodium hydroxide solution with a mass concentration of 20%, the FeS-based pH-responsive material prepared above was added with a molar ratio of $S^{2-}$ in the material to $Cu^{2+}$ in the copper-containing wastewater from micro-etching controlled at 1.2:1, and a reaction was allowed for 20 min.

Comparative Example 3

An appropriate amount of the copper-containing wastewater from micro-etching was taken and added to a reaction vessel, a pH was adjusted to 3.00±0.05 using a sulfuric acid solution with a volume concentration of 10% and a sodium hydroxide solution with a mass concentration of 20%, the FeS-based pH-responsive material prepared above was added with a molar ratio of $S^{2-}$ in the material to $Cu^{2+}$ in the copper-containing wastewater from micro-etching controlled at 1.2:1, and a reaction was allowed for 20 min.

Comparative Example 4

An appropriate amount of the copper-containing wastewater from micro-etching was taken and added to a reaction vessel, a pH was adjusted to 7.00±0.05 using a sulfuric acid solution with a volume concentration of 10% and a sodium hydroxide solution with a mass concentration of 20%, the FeS-based pH-responsive material prepared above was added with a molar ratio of $S^{2-}$ in the material to $Cu^{2+}$ in the copper-containing wastewater from micro-etching controlled at 1.2:1, and a reaction was allowed for 20 min.

A solution produced after the treatment in each of Examples 1 to 4 and Comparative Examples 1 to 4 was filtered to obtain a filtrate and a precipitate with CuS as a main component. A concentration of residual $Cu^{2+}$ in the filtrate was determined by inductively coupled plasma-atomic emission spectroscopy (ICP-AES), as shown in Table 2.

TABLE 2

Metal element content after the copper-containing wastewater from micro-etching is treated

| Examples | pH | $[S^{2-}]$:$[Cu^{2+}]$ | $Cu^{2+}$(mg/L) | $Cu^{2+}$ recovery rate (%) |
|---|---|---|---|---|
| Example 1 | 4.20 ± 0.05 | 1.2:1.0 | 1.15 | 99.82 |
| Example 2 | 5.00 ± 0.05 | 1.2:1.0 | 0.45 | 99.93 |

TABLE 2-continued

Metal element content after the copper-containing wastewater from micro-etching is treated

| Examples | pH | [$S^{2-}$]:[$Cu^{2+}$] | $Cu^{2+}$(mg/L) | $Cu^{2+}$ recovery rate (%) |
|---|---|---|---|---|
| Example 3 | 5.80 ± 0.05 | 1.2:1.0 | 0.96 | 99.85 |
| Example 4 | 5.00 ± 0.05 | 1.0:1.0 | 43.52 | 99.31 |
| Comparative Example 1 | 1.00 ± 0.05 | 1.2:1.0 | 280.24 | 56.21 |
| Comparative Example 2 | 2.00 ± 0.05 | 1.2:1.0 | 220.05 | 65.62 |
| Comparative Example 3 | 3.00 ± 0.05 | 1.2:1.0 | 93.36 | 85.41 |
| Comparative Example 4 | 7.00 ± 0.05 | 1.2:1.0 | 157.36 | 75.41 |

According to the comparison of data of the examples and comparative examples in Table 2: When the copper-containing wastewater from micro-etching is treated with the FeS-based pH-responsive material of the present disclosure at a pH value of 3.95 to 6.05, a content of copper ions in the treated copper-containing wastewater from micro-etching is low, and a recovery rate of copper ions is 99.8% or more. When a pH of a solution system is too low or too high, a recovery effect of the FeS-based pH-responsive material for copper ions is greatly reduced.

What is claimed is:

1. A method for recycling a copper-containing wastewater from a micro-etching, comprising adding a FeS-based pH-responsive material to a weakly-acidic copper-containing wastewater from the micro-etching, to allow a reaction I to obtain a precipitate with CuS as a main component, wherein
the FeS-based pH-responsive material is prepared through the following process: slowly adding a sulfide salt solution to a mixed solution comprising a modified crosslinking agent, a stabilizing and dispersing agent, and a ferrous salt, to allow a heterogeneous precipitation reaction to obtain the FeS-based pH-responsive material; wherein the modified crosslinking agent is obtained through a crosslinking reaction of a monomer comprising both carboxyl and sulfhydryl with a crosslinking agent;
the reaction I is conducted at a pH value of 3.95 to 6.05 for 10 min to 25 min;
a $Cu^{2+}/S^{2-}$ molar ratio of the copper-containing wastewater from the micro-etching to the FeS-based pH-responsive material is 1:(1.0-1.25);
the monomer comprising both the carboxyl and the sulfhydryl comprises at least one of mercaptopropionic acid, mercaptoacetic acid, and mercaptoacrylic acid;
the crosslinking agent is nanoscale silica; and
a molar ratio of the monomer comprising both the carboxyl and the sulfhydryl to the crosslinking agent is (1.0-1.6):1.

2. The method for recycling the copper-containing wastewater from the micro-etching according to claim 1, wherein
the stabilizing and dispersing agent comprises carboxymethyl cellulose (CMC);
a sulfide salt in the sulfide salt solution comprises at least one of sodium sulfide and calcium polysulfide; and
the ferrous salt comprises at least one of ferrous sulfate, ferrous ammonium sulfate, ferrous chloride, a ferrous sulfate hydrate, a ferrous ammonium sulfate hydrate, and a ferrous chloride hydrate.

3. The method for recycling the copper-containing wastewater from the micro-etching according to claim 1, wherein
a molar ratio of the crosslinking agent to the ferrous salt is 1:(1-3); and
a molar ratio of the stabilizing and dispersing agent to the ferrous salt is $(5.0 \times 10^{-4} - 2.0 \times 10^{-3})$:1.

4. The method for recycling the copper-containing wastewater from the micro-etching according to claim 3, wherein a $Fe^{2+}/S^{2-}$ molar ratio of the ferrous salt to a sulfide salt in the sulfide salt solution is (1-1.2):1.

5. The method for recycling the copper-containing wastewater from the micro-etching according to claim 1, wherein the heterogeneous precipitation reaction is conducted under oxygen-free conditions.

6. The method for recycling the copper-containing wastewater from the micro-etching according to claim 1, wherein the heterogeneous precipitation reaction is conducted at 25° C. to 35° C. for 60 min to 120 min.

7. The method for recycling the copper-containing wastewater from the micro-etching according to claim 5, wherein the heterogeneous precipitation reaction is conducted at 25° C. to 35° C. for 60 min to 120 min.

* * * * *

UNITED STATES PATENT AND TRADEMARK OFFICE
CERTIFICATE OF CORRECTION

| | | |
|---|---|---|
| PATENT NO. | : 12,221,366 B1 | Page 1 of 1 |
| APPLICATION NO. | : 18/804147 | |
| DATED | : February 11, 2025 | |
| INVENTOR(S) | : Chenyang Zhang | |

It is certified that error appears in the above-identified patent and that said Letters Patent is hereby corrected as shown below:

On the Title Page

Insert:
--(30) Foreign Application Priority Data
Sep. 14, 2023 (CN) ...........................202311184483.0--

Signed and Sealed this
Twenty-fifth Day of March, 2025

Coke Morgan Stewart
*Acting Director of the United States Patent and Trademark Office*